US007498951B2

(12) United States Patent
Wardimon (10) Patent No.: US 7,498,951 B2
(45) Date of Patent: *Mar. 3, 2009

(54) MOTION SENSITIVE ILLUMINATION SYSTEM AND METHOD FOR A MOBILE COMPUTING DEVICE

(75) Inventor: Yavor Eliad Wardimon, Binyamina (IL)

(73) Assignee: IXI Mobile (R &D), Ltd. (IL)

( * ) Notice: Subject to any disclaimer, the term of this patent is extended or adjusted under 35 U.S.C. 154(b) by 0 days.

This patent is subject to a terminal disclaimer.

(21) Appl. No.: 10/968,375

(22) Filed: Oct. 18, 2004

(65) Prior Publication Data

US 2006/0081771 A1    Apr. 20, 2006

(51) Int. Cl.
*G08B 21/00* (2006.01)
*H04M 11/00* (2006.01)
*G09G 3/36* (2006.01)

(52) U.S. Cl. ............... 340/691.3; 340/525; 340/691.1; 340/691.6; 340/815.45; 345/102; 455/403; 455/410

(58) Field of Classification Search ............... 340/691.3
See application file for complete search history.

(56) References Cited

U.S. PATENT DOCUMENTS

| 6,107,930 | A | * | 8/2000 | Behlke et al. | ......... 340/825.19 |
|---|---|---|---|---|---|
| 6,369,794 | B1 | * | 4/2002 | Sakurai et al. | ............. 345/156 |
| 6,664,744 | B2 | * | 12/2003 | Dietz | ......................... 315/291 |
| 6,801,794 | B2 | * | 10/2004 | Bauer | ......................... 455/574 |
| 2001/0013854 | A1 | * | 8/2001 | Ogoro | ........................ 345/102 |
| 2004/0012556 | A1 | * | 1/2004 | Yong et al. | .................. 345/102 |
| 2005/0225983 | A1 | * | 10/2005 | Fornell | ....................... 362/276 |

* cited by examiner

*Primary Examiner*—Donnie L Crosland
(74) *Attorney, Agent, or Firm*—Century IP Group, Inc.; F. Jason Far-hadian, Esq.

(57) ABSTRACT

A motion sensitive illumination method for a mobile device is provided. The method comprises measuring a first motion attribute of the mobile device using a motion sensor to produce a first value; comparing the first value with a threshold value; and adjusting illumination intensity of an illuminating mechanism that illuminates a user interface component of the mobile device, when the first value is not approximately equal to a first threshold value.

19 Claims, 4 Drawing Sheets

MOTION SENSITIVE ILLUMINATION SYSTEM AND METHOD FOR A MOBILE COMPUTING DEVICE

BACKGROUND

1. Field of Invention

The present invention relates generally to an illumination mechanism for a mobile device and, more particularly, to controlling the backlight for a mobile communication device by way of detecting changes in movement of the mobile communication device.

2. Copyright & Trademark Notices

A portion of the disclosure of this patent document contains material, which is subject to copyright protection. The owner has no objection to the facsimile reproduction by any one of the patent document or the patent disclosure, as it appears in the Patent and Trademark Office patent file or records, but otherwise reserves all copyrights whatsoever.

Certain marks referenced herein may be common law or registered trademarks of third parties affiliated or unaffiliated with the applicant or the assignee. Use of these marks is for providing an enabling disclosure by way of example and shall not be construed to limit the scope of this invention to material associated with such marks.

3. Related Art

Handheld communication and computing devices such as cellular phones and personal digital assistants (PDAs) are generally equipped with a lighting mechanism that is used to illuminate the device's keypad or screen. This lighting mechanism is typically referred to as a "backlight" and consists of a light emitting diode (LED) positioned in the back of the keypad or the screen.

The currently implemented backlight systems either constantly remain on while the phone is turned on, or are turned on as soon as the user interacts with the device, for example, when a button on the keypad is pressed. Some backlight systems are complemented with a shutoff timer that can be set by the user to turn off the backlight, if the user does not interact with the device for a predetermined period.

While this shutoff timer is useful in preserving battery power, it is problematic in that it requires the user to press an arbitrary key on the device's keypad to activate the backlight. At times, pressing an arbitrary key may result in performance of an unintended function in addition to activating the backlight, because certain keys on the keypad are programmed to perform special functions (e.g., establishing a connection to the internet, speed dialing, instant messaging, etc.).

It is therefore understandable that a user may become frustrated or inconvenienced if an unintended function is performed, when the user only means to turn the backlight on. Further, if the device is in a lock mode, pressing the keys on the keypad may not activate the backlight unless the lock code is fully entered. This is problematic because typically a user is not even able to see the keys or the unlocking instructions on the device's display when the backlight is off.

As such, a system and method is needed that can overcome the above shortcomings by activating the backlight and/or unlocking the device without requiring the user to press a key on the keypad.

SUMMARY

The present disclosure is directed to a system and corresponding methods for controlling an illumination or lock mechanism of a mobile communication device.

For the purpose of summarizing, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested.

In accordance with one or more embodiments, a method for controlling an illumination system for a mobile device is provided. The method comprises measuring a first motion attribute of the mobile device using a motion sensor to produce a first value; comparing the first value with a threshold value; and adjusting illumination intensity of an illuminating mechanism that illuminates a user interface component of the mobile device, when the first value is not approximately equal to a first threshold value.

The adjusting comprises increasing the illumination intensity of the illuminating mechanism when the first value is greater than the threshold value, or decreasing the illumination intensity when the first value is less than the threshold value. In one embodiment, the illuminating mechanism is a backlight for lighting the user interface and the user interface comprises one or more keys on a keypad of the mobile device or display screen of the mobile device. In another embodiment, a lock status of the mobile device is controlled based on the first value.

In accordance with another embodiment, a motion sensitive illumination system for illuminating one or more user interface components of a mobile device is provided. The illumination system comprises a motion sensor for measuring a first change in a motion attribute of the mobile device; a first illumination mechanism for illuminating at least a first user interface component; and a power management module for adjusting illumination intensity of the first illumination mechanism based on the first change in the motion attribute of the mobile device.

The power management module causes the illumination intensity of the first illumination mechanism to be increased, when the first change is greater than a first threshold. Alternatively, the power management module causes the illumination intensity of the first illumination mechanism to be decreased, when the first change is less than a first threshold. The motion attribute may be associated with the mobile device's positioning, speed, acceleration or other movement characteristics. In one embodiment, a time delay is associated with adjusting illumination intensity of the first illumination mechanism.

In accordance with one aspect of the invention, the power management module comprises a power management chip in communication with a microcontroller for determining a degree with which the illumination intensity of the first illumination mechanism is adjusted. The power management chip converts a first signal provided by the motion sensor to a second signal provided to the microcontroller, wherein the first signal represents a change in a motion attribute of the mobile device, and the second signal represents a value used by the microcontroller to adjust the intensity of the first illumination mechanism.

In accordance with yet another embodiment, a method of configuring one or more lock states for at least one user interface of a mobile device is provided. The method comprises monitoring at least one motion attribute of the mobile device; and switching at least one user interface of the mobile device from a first lock state to a second lock state, when said at least one motion attribute reaches a first threshold value.

These and other embodiments of the present invention will also become readily apparent to those skilled in the art from the following detailed description of the embodiments having reference to the attached figures, the invention not being limited to any particular embodiments disclosed.

BRIEF DESCRIPTION OF THE DRAWINGS

Embodiments of the present invention are understood by referring to the figures in the attached drawings, as provided below.

Features, elements, and aspects of the invention that are referenced by the same numerals in different figures represent the same, equivalent, or similar features, elements, or aspects, in accordance with one or more embodiments.

DETAILED DESCRIPTION

A control system and corresponding methods, according to an embodiment of the present invention, facilitate the operation and provide an illumination system for a mobile device so that user interface components of the device are illuminated or controlled based on the mobile device's movement.

The illumination system may be implemented in form of a background or foreground lighting system embedded in or otherwise attached to the mobile device. Access to user interface components may be controlled by way of activating a locking mode when the mobile device remains idle for a predetermined period.

Numerous specific details are set forth to provide a thorough description of various embodiments of the invention. Certain embodiments of the invention, however, may be practiced without these specific details or with some variations in detail.

Figure 1:
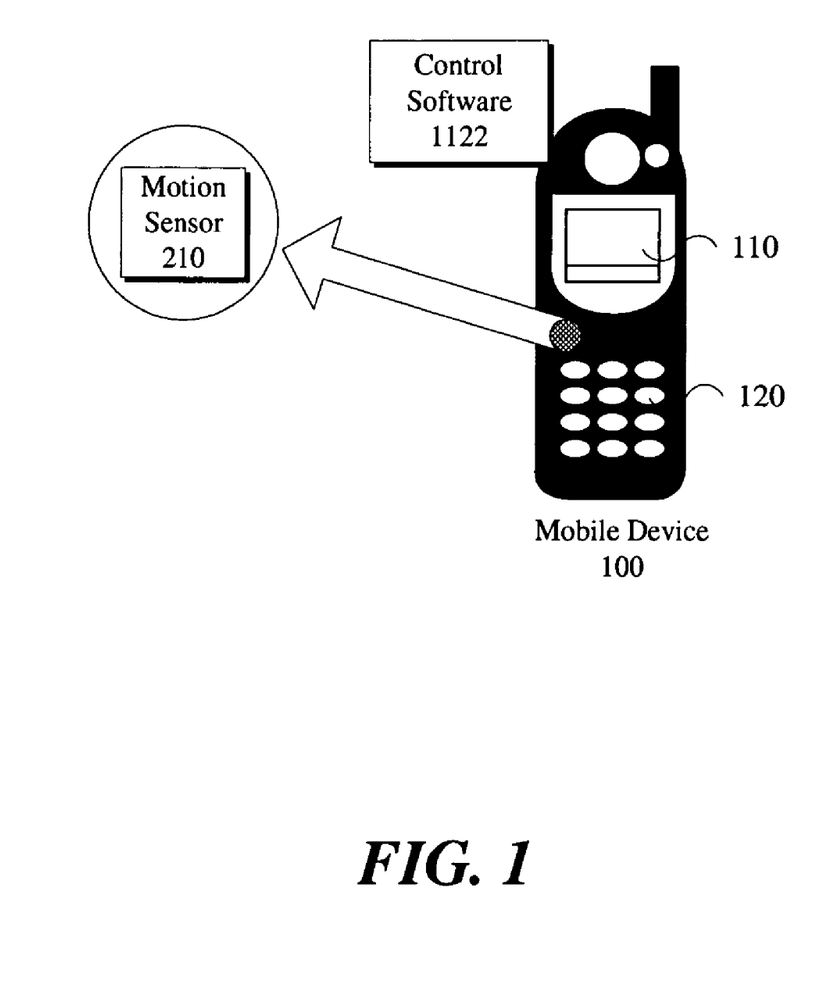
FIG. 1 illustrates an exemplary environment in which a motion activated illumination mechanism may be utilized, in accordance with one embodiment of the invention.

Referring to FIG. 1, in accordance with one or more embodiments of the invention, a mobile device 100 comprises user interface components 110, 120 and a motion senor 210. User interface components 110, 120 allow the user to view or input data. As shown, the user interface may comprise a display screen 110 and a keypad 120, for example.

Motion sensor 210 may be a digital or analog sensor embedded in mobile device 100's circuitry to detect changes in movement of mobile device 100. Mobile device 100, in one embodiment, further comprises an illumination system 200 (see FIG. 2) for illuminating the mobile device 100's user interface components, in accordance with a signal generated by motion sensor 210. The illumination enhances a user's ability to view and interact with the mobile device 100's user interface.

In one embodiment, a lock mechanism is incorporated in mobile device 100 to lock keypad 120 such that key presses are not recognized until a lock code is entered. This lock mechanism functions to both prevent unauthorized use of mobile device 100 and accidental key input, for example, when the user is carrying mobile device 100 in his pocket.

Figure 2:
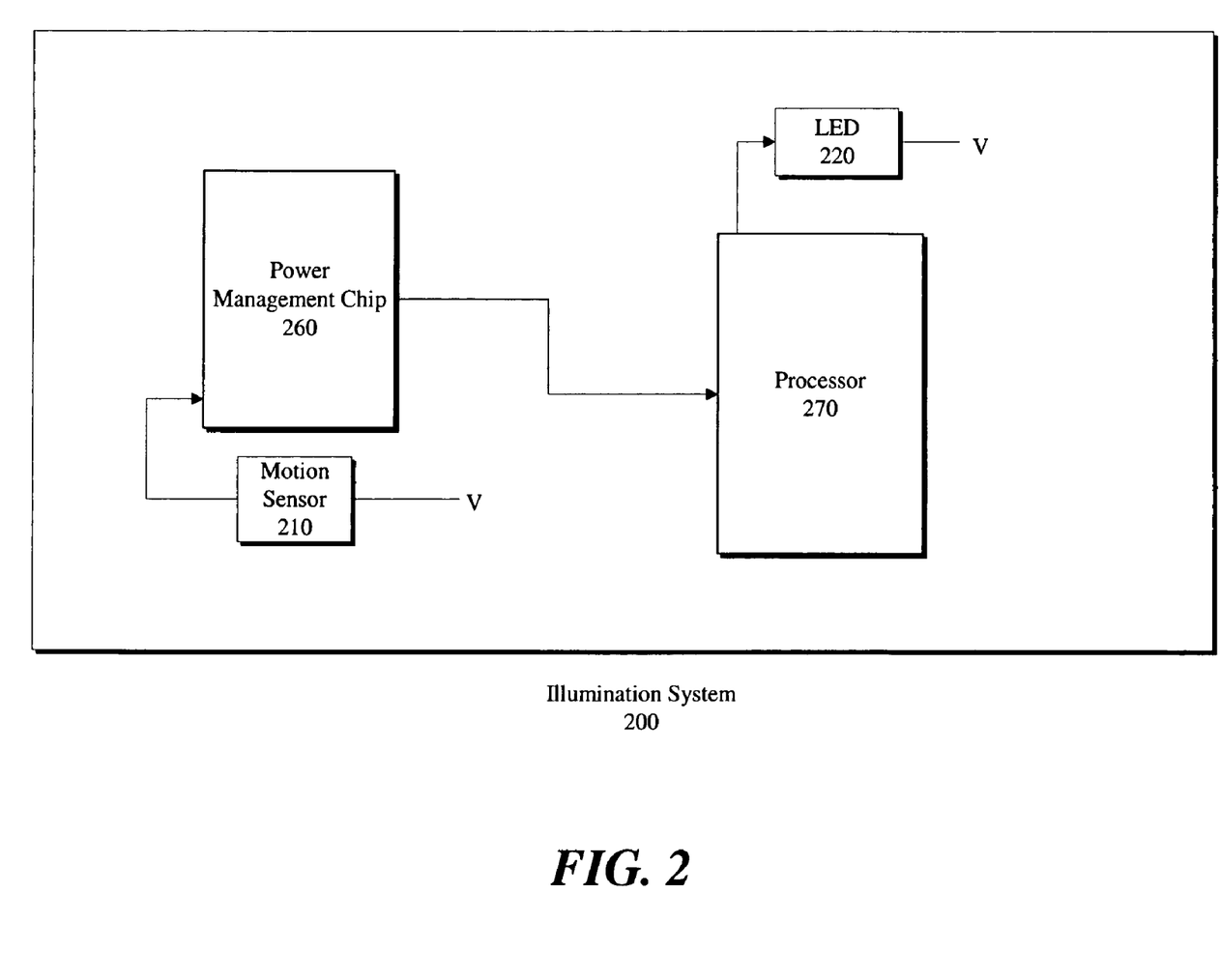
FIG. 2 is a block diagram of an exemplary power management system configured to control an illumination mechanism, in accordance with one or more embodiments.

In certain embodiments, control software 1122 is executed on mobile device 100 to detect an idle state and activate a lock mode automatically after a threshold period has passed or according to user instructions. Similarly, control software 1122 may be implemented to detect an idle state and control (i.e., activate or deactivate) illumination system 200 as needed.

As such, control software 1122 is stored in and/or executed on mobile device 100 to control the operation and functional features of illumination system 200 or a lock state of mobile device 100. Control software 1122, for example, may be comprised of one or more modules that are executed on one or more computing systems in an integrated or distributed environment, as provided in further detail below.

In the following, one or more embodiments of the invention are disclosed, by way of example, as applicable to a method of controlling the illumination system 200 based on movements detected by motion sensor 210. It is noteworthy that the same or a similar implementation may be applied to a method for controlling a locking mechanism, such that the locking state of mobile device 100 can be activated and deactivated based on changes detected by motion sensor 210.

One of ordinary skill in the art will appreciate that mobile device 100, in accordance with one embodiment, may be connected to one or more types of networks (e.g., personal area networks, local area networks, cellular communications networks, personal mobile gateways, etc.) without limiting the scope of the invention. The terms "connected," "coupled," or any variant thereof, mean any connection or coupling, either direct or indirect, between two or more elements. The coupling or connection between the elements can be physical, logical, or a combination thereof.

In one embodiment, mobile device 100 may comprise one or more means of wireless communications. Wireless communication technologies suited for connecting wireless devices in short-range area networks (i.e., IEEE 802.11 or Bluetooth), and long-range area networks (i.e., GSM, UMTS, WCDMA, etc.) and the like may be utilized to connect mobile device 100 to other mobile devices or wireless infrastructure components, for example. Mobile device 100, in one or more embodiments, can be a cellular telephone, a personal digital assistant (PDA), a laptop computer, or other computing or processing machine capable of data storage and data communication, for example.

Referring to FIG. 2, in one or more embodiments, illumination system 200 comprises one or more electrical modules or components, such as a motion sensor 210 and an illuminating mechanism 220 (e.g., an LED). Reference to motion sensor 210 and illuminating mechanism 220 is made in the singular form through out this disclosure. In alternative embodiments of the invention, however, any number of sensors 210 or illuminating mechanisms 220, either alone or in combination, may be utilized depending on implementation.

Motion sensor 210 is implemented to determine changes in mobile device 100's motion attributes. In one embodiment, for example, motion sensor 210 is used to measure or detect speed, acceleration, deceleration and direction of mobile device 100's movement. Motion sensor 210 may be also implemented to detect a degree of shock or pressure applied to mobile device 100, for example. In one embodiment, motion sensor 210 may also detect changes in motion or position attributes (e.g., whether the device is standing upright, laying horizontally, etc.)

In one embodiment, motion sensor 210 is implemented in form of an accelerometer, inclinometer, gyrometer, or a combination of said motion detection mechanisms. Motion sensor 210 may comprise a TMA102CSP chipset, for example, manufactured by Tronics Microsystems (http://www.tronics-mst.com). TMA102CSP is a silicon-based sensor designed for highly miniature and integrated embedded motion sensing applications and offers a good linear response and a high sensitivity to low gravitational accelerations.

Illuminating mechanism 220 may be a light emitting diode (LED), an electro luminescent (EL), or other light producing means that can be turned on or off, or controlled to emanate light. It is noteworthy that illuminating system 200 may comprise software or hardware modules, such as power amplifiers, transistors, field effect transistors (FETs), etc. that can be used instead, in conjunction or in combination with the light emitting mechanism 220 to accomplish the results contemplated herein.

In FIG. 2, an exemplary embodiment of illumination system 200 is illustrated that comprises a motion sensor 210, illuminating mechanism 220 (hereafter referred to by way of example as "LED 220"), a power management chip 260 and a processor 270. Power management chip 260 may be a semiconductor device, or other logic module implemented in hardware, software or a combination of the two. For example, in one embodiment, power management chip 260 may comprise a programmable logic device (PLD) (e.g., a field programmable gate array (FPGA), an application specific integrated circuit (ASIC), etc.).

In one embodiment, motion sensor 210 in response to detecting a movement or change in position of mobile device 100 generates a signal that provides a measure for the mobility of mobile device 100. That is, the signal generated by motion sensor 210 provides information about one or more of the following motion attributes: the relative vertical or horizontal position of the mobile device 100, mobile device 100's direction, speed, acceleration or movement, and changes in mobile device 100's relative position, direction, speed, acceleration, etc., for example.

In one embodiment, processor 270 is a microprocessor or a microcontroller designed and developed by Texas Instruments Inc., Motorola Inc., or other chipmakers. Processor 270 operates based on instructions provided by control software 1122 and control signal produced by power management chip 260, for example, to determine the activation time or intensity of LED 220's illumination. One skilled in the art would understand that other functional equivalent signal processing modules may be utilized to perform the signal processing in alternative embodiments.

Control software 1122 may comprise one or more software modules or may be implemented in form of one or more hardware modules, or a combination of hardware and software. These modules are collectively or individually executed on processor 270 and/or power management chip 260 to perform the related control and illumination functions. Thus, in one or more embodiments, a control mechanism such as control software 1122 in conjunction with power management chip 260 and processor 270 is implemented to control LED 220 luminance, according to control signals generated by motion sensor 210 and power management chip 260.

It is noteworthy that the hardware components illustrated in FIG. 2, such as power management chip 260, processor 270, and motion sensor 210 may be implemented in accordance with one or more embodiments, as hardware or software modules, a combination of the two, or alternative embodiments that accomplish the same functions. For example, in one embodiment, power management chip 260 can be implemented as an analog to digital (A/D) converter for converting the signal generated by motion sensor 210 to a second signal representing the intensity of detected movement.

In accordance with one embodiment, if a level of movement or a level of change in a motion attribute is detected by motion sensor 210 then LED 220 is turned on; otherwise LED 220 is turned off. As an alternative to switching the LED 220 on or off, power management chip 260 may be implemented to control the illumination intensity of LED 220 based on the value of the output signal generated by motion sensor 210. For example, if a high level of movement is detected then illumination intensity of LED 220 may be set at a first level (e.g., bright). If a low level of movement is detected then illumination intensity may be set at a second level (e.g., dim), for example. Thus, various illumination states may be implemented for various levels of movement or change.

In certain embodiments, one or more threshold levels may be associated with the degree of movement or change detected by motion sensor 210. That is, the intensity of illumination (or on/off state) of LED 220 may be controlled, for example, based on whether or not motion sensor 210 has detected a certain level of movement or change in value of a motion attribute. Thus, in some embodiments, one or more threshold values are set so that when the detected movement level or value exceeds or approaches such thresholds, power management chip 260 causes processor 270 to respectively change the degree of illumination of LED 220.

For example, if a threshold value is set equal to X then LED 220 is activated when intensity of detected movement or change in value falls below the threshold value X. A reverse relationship can be also implemented, such that LED 220 is deactivated, for example, if intensity of detected movement or change in value exceeds the threshold value X. Accordingly, in addition to or instead of detecting mobile device 100's movement, motion sensor 210 can be set to detect and measure changes in value of different motion attributes.

The value of a motion attribute can, for example, provide information about the relative position, the intensity of movement (e.g., acceleration, speed, etc.) and the direction of movement of mobile device 100. Therefore, when said value is compared with a threshold value (e.g., a default value set by the user or the manufacturer), then the intensity of illumination or an on/off state for mobile device 100 can be determined accordingly.

Implementation of a single threshold value can result in an undesirable jittering effect when the detected level of movement is approximately equal or near the threshold value X. That is, the LED 220 may be repeatedly activated and deactivated if the level of movement continuously falls below or exceeds the threshold value. To over come this effect, in one embodiment, two separate thresholds X1 and X2 are implemented, such that X1 is less than X2, for example. Thus, when the detected level of movement is between X1 and X2, the illumination state of LED 220 remains at status quo. If the detected level of movement, however, exceeds X2 then LED 220 is turned on or remains on until the level of movement falls below X1.

Figure 3:
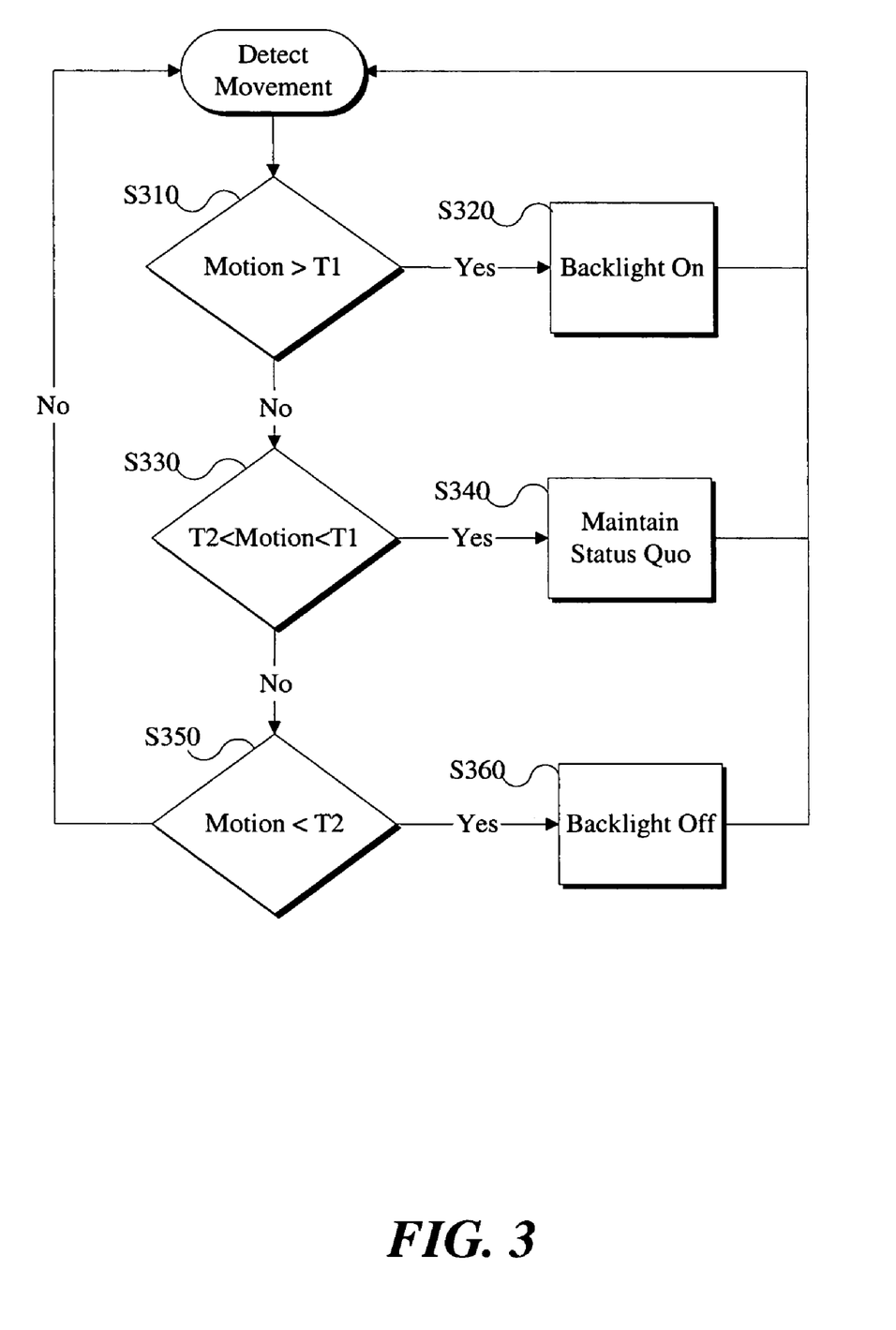
FIG. 3 is a flow diagram of a control method for the exemplary power management system illustrated in FIG. 2, in accordance with one or more embodiments.

Referring to FIG. 3, an exemplary method for controlling the operation of illumination system 200 is provided. It should be noted that part or all of this exemplary method may be implemented as logic code in hardware, software or a combination of the two. In one embodiment, the method illustrated in FIG. 3 is implemented in form of control software 1122, by way of example, for controlling the backlight for a screen 110 or keypad 120.

In other embodiments, different user interface devices may be illuminated according to the concepts and advantages provided herein. In yet other embodiments, the motion detection scheme of the present invention may be used to limit access to (e.g., lock or unlock) said user interface devices. Therefore, the scope of the invention shall not be construed as limited to an illumination system or devices particularly disclosed herein for the purpose of example.

Referring to FIGS. 1, 2 and 3, in an exemplary embodiment of the invention, control software 1122 provides instructions to processor 270 (in conjunction with power management chip 260) to process the signal generated by motion sensor 210. For example, based on the signal provided by motion sensor 210, power management chip 260 may detect that the value of a motion attribute has exceeded a first threshold T1 (S310). If so, then control software 1122 causes processor 270 to generate a signal to control LED 220, such that the backlight is turned on, or remains on (S320).

If the motion attribute value is determined to be between the first threshold T1 and the second threshold T2 (S330), then control software 1122 causes processor 270 to maintain status quo by generating a signal to keep the backlight on or off depending on the previous illumination state (S340). If the motion attribute value falls below the second threshold T2 (S350), then control software 1122 causes processor 270 to generate a signal to turn the backlight off or keep the back light in an off state (S360).

When the backlight is off, if the motion attribute value exceeds the second threshold T2, but not the first threshold T1 (S330), then control software 1122 causes processor 270 to maintain status quo by generating a signal to keep the backlight off (S340). Once the motion attribute value increases beyond the first threshold T1, then control software 1122 causes processor 270 to generate a signal to control LED 220, such that the backlight is turned on (S320).

FIG. 3 represents an exemplary method implemented to control the illumination system 200 of the present invention in accordance with one embodiment. In other embodiments, different logic and control orders may be implemented to accomplish the same or similar results. As noted earlier, illumination system 200 may be designed to control the illumination intensity of the backlight (e.g., LED 220), instead of simply turning it on and off. As such, the backlight illumination may be changed in degradations according to changes in the detected level of movement.

For example, instead of turning the backlight on, illumination system 200 may gradually increase the intensity of the backlight, until a maximum threshold is exceeded. A reverse method for reducing the intensity of backlight can be implemented in other embodiments, so that the backlight's luminance is gradually decreased to a minimum (e.g., zero), instead of turning the backlight off.

As such, alternative embodiments of the invention may be implemented to control the illumination of the user interface components, such as screen 110 and keypad 120, based on gradual changes in the value of the motion attribute. Thus, instead of turning the respective backlights for each user interface on and off, each backlight is gradually made brighter or dimmer.

In one embodiment, if mobile device 110 is left on a table, for example, then motion sensor 210 will not detect any movement or change in a motion attribute. Therefore, motion sensor 210 will generate a signal for LED 220 to be turned off. If a user picks up mobile device 100 from the table, motion sensor 210 will detect a change in a motion attribute (e.g., speed, acceleration, position, etc.) and will generate a signal for LED 220 to be turned on.

A similar scheme may be applied to activate or deactivate a lock mechanism of mobile device 100. Thus, for example, if mobile device is left on a table such that no change in a motion attribute is detected, then mobile device 100 is locked. When a user picks up mobile device 100, for example, then the lock mode is deactivated as motion sensor 210 detects a change in a motion attribute.

Other events may trigger a change in the illumination or lock state of mobile device 100. For example, a sudden change in positioning of a mobile device 100 (e.g., from a horizontal to a vertical direction) may be detected as a change in a motion attribute associated with the relative position of mobile device 100. Or, a sudden change in motion (i.e., aggressively shaking) of mobile device 100 may be detected as a change in a motion attribute that would warrant adjusting mobile device 100's illumination or lock state.

In one embodiment, control software 1122 may be implemented to control the illumination or lock state of user interface components 110, 120 based on occurrence of at least two events. For example, illumination system 200 may be deactivated, if mobile device 100 is in a horizontal position and no change in a motion attribute is detected. Or, illumination system 200 may be activated, if mobile device 100 is in a horizontal position and a slight change (i.e., a tap) is detected in a motion attribute of mobile device 100.

In certain embodiments, a time delay is associated with the activation or deactivation of the illumination or the locking mechanism. That is, if motion sensor 210 detects no change in a motion attribute, then it waits for a predetermined time (i.e., set by the user or the manufacturer) before it generates a signal to deactivate the illumination system or activate the lock mechanism, respectively. Alternatively, once motion sensor 210 detects a change in a motion attribute, it may be programmed to wait for a second predetermined time (e.g., 2 seconds) to activate the illumination system or deactivate the lock mechanism, respectively.

In some embodiments, the control, monitoring and detecting functions discussed above in relation to control software 1122 are implemented in hardware, or a combination of hardware and software. As such, although control software 1122 is disclosed as applicable to the system of the present invention, this application is by way of example and shall not be construed to limit the scope of the invention to a software solution.

In one or more embodiments of the system, mobile device 100 comprises a controlled system environment that can be presented largely in terms of hardware components and software code executed to perform processes that achieve the results contemplated by the system of the present invention. A more detailed description of such system environment is provided below with reference to FIGS. 4A and 4B.

Figure 4A:
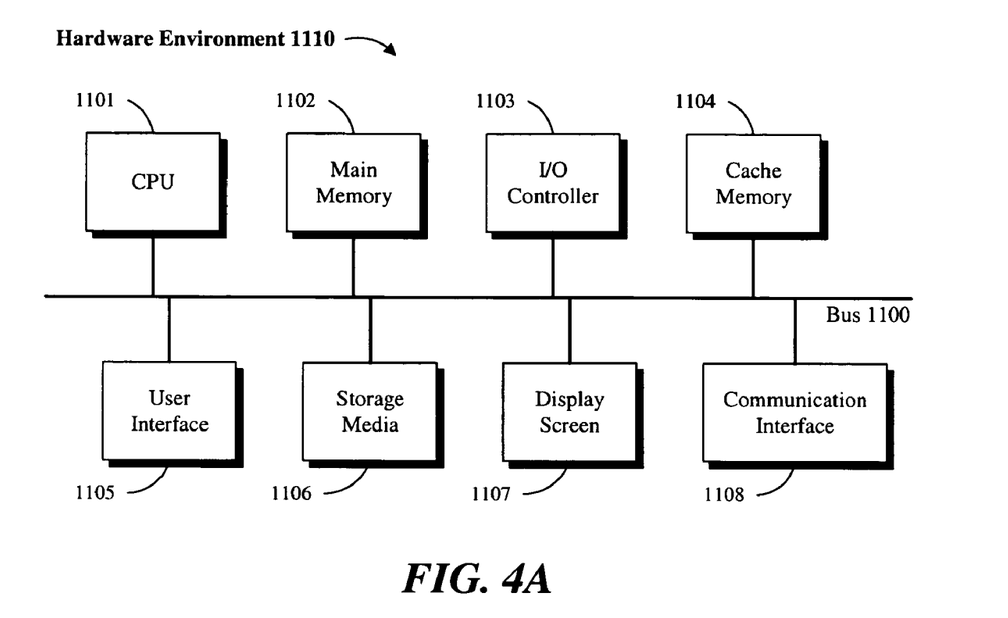
FIGS. 4A and 4B are block diagrams of hardware and software environments in which a system of the present invention may operate, in accordance with one or more embodiments.
Figure 4B:
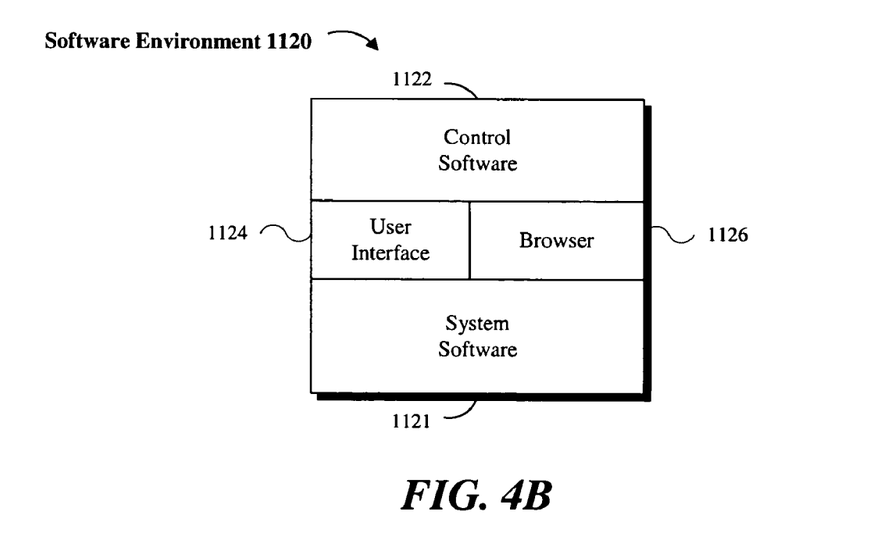

As shown, a computing system environment is composed of two environments, a hardware environment 1110 and a software environment 1120. The hardware environment 1110 comprises the machinery and equipment that provide an execution environment for the software. The software provides the execution instructions for the hardware. It should be noted that certain hardware and software components might be interchangeably implemented in either form, in accordance with different embodiments of the invention.

Referring to FIG. 4A, an embodiment of the control software 1122 can be implemented as logic code in the form of computer readable code executed on a general purpose hardware environment 1110 that comprises a central processor unit (CPU) 1101, a main memory 1102, an input/output controller 1103, optional cache memory 1104, a user interface 1105 (e.g., keypad, pointing device, etc.), storage media 1106 (e.g., hard drive, memory, etc.), a display screen 1107, a communication interface 1108 (e.g., a wireless network card, a Bluetooth port, a wireless modem, etc.), and a system synchronizer (e.g., a clock, not shown in FIG. 4A).

Cache memory 1104 is utilized for storing frequently accessed information. A communication mechanism, such as a bi-directional data bus 1100, can be utilized to provide for means of communication between system components. Hardware Environment 1110 is capable of communicating with local or remote systems connected to a wireless communications network (e.g., a PAN or a WAN) through communication interface 1108.

In one or more embodiments, hardware environment 1110 may not include all the above components, or may include additional components for additional functionality or utility. For example, hardware environment 1110 can be a laptop computer or other portable computing device that can send messages and receive data through communication interface 1108. Hardware environment 1110 may also be embodied in an embedded system such as a set-top box, a personal digital assistant (PDA), a wireless communication unit (e.g., cellular phone), or other similar hardware platforms that have information processing and/or data storage and communication capabilities.

In one embodiment of the system, communication interface 1108 can send and receive electrical, electromagnetic, or optical signals that carry digital data streams representing various types of information including program code. If communication is established via a communications network, hardware environment 1110 may transmit program code through the network connection. The program code can be executed by central processor unit 1101 or stored in storage media 1106 or other non-volatile storage for later execution.

Program code may be transmitted via a carrier wave or may be embodied in any other form of computer program product. A computer program product comprises a medium configured to store or transport computer readable code or a medium in which computer readable code may be embedded. Some examples of computer program products are memory cards, CD-ROM disks, ROM cards, floppy disks, magnetic tapes, computer hard drives, and network server systems.

In one or more embodiments of the invention, processor 1101 is a microprocessor manufactured by Motorola, Intel, or Sun Microsystems Corporations, for example. The named processors are for the purpose of example; thus, any other suitable microprocessor, microcontroller, or microcomputer may be utilized.

Referring to FIG. 4B, software environment 1120 or one or more of its components is stored in storage media 1106 and is loaded into memory 1102 prior to execution. Software environment 1120 comprises system software 1121 and control software 1122. Depending on implementation, certain aspects of software environment 1120, and particularly control software 1122, can be loaded on one or more hardware environments 1110, or subcomponents thereof.

System software 1121 comprises software such as an operating system that controls the low-level operations of hardware environment 1110. Low-level operations comprise the management of the system resources such as memory allocation, file swapping, and other core computing tasks. In one or more embodiments of the invention, the operating system can be Nucleus, Microsoft Windows, Macintosh OS, or Linux. However, any other suitable operating system may be utilized.

Control software 1122 can comprise one or more computer programs that are executed on top of system software 1121 after being loaded from storage media 1106 into memory 1102. In a client-server architecture, control software 1122 may comprise client software and/or server software executed on an integrated or distributed environment.

Software environment 1120 may also comprise web browser software 1126 for accessing content on a remote server. Further, software environment 1120 may comprise user interface software 1124 (e.g., a Graphical User Interface (GUI)) for receiving user commands and data. The received commands and data are processed by the software applications that run on the hardware environment 1110. The hardware and software architectures and environments described above are for purposes of example only. Embodiments of the invention may be implemented in any type of system architecture or processing environment.

Embodiments of the invention are described by way of example as applicable to systems and corresponding methods for controlling the illumination or lock state of a mobile device. In this exemplary embodiment, logic code for performing these methods is implemented in the form of, for example, control software 1122. The logic code, in one embodiment, may be comprised of one or more modules that execute on one or more processors in a distributed or non-distributed communication model. For example, one or more embodiments of the present invention may comprise separate radio and baseband modules, or alternatively modules incorporating the radio, baseband, micro-controller and flash memory in a single-chip solution.

It should also be understood that the programs, modules, processes, methods, and the like, described herein are but exemplary implementations and are not related, or limited, to any particular computer, apparatus, or computer programming language. Rather, various types of general-purpose computing machines or customized devices may be used with logic code implemented in accordance with the teachings provided, herein. Further, the order in which the methods of the present invention are performed is purely illustrative in nature. These methods can be performed in any order or in parallel, unless indicated otherwise in the present disclosure.

The methods of the present invention may be performed in either hardware, software, or any combination thereof. In particular, some methods may be carried out by software, firmware, or macrocode operating on a single computer or a plurality of computers. Furthermore, such software may be transmitted in the form of a computer signal embodied in a carrier wave, and through communication networks by way of Internet portals or websites, for example. Accordingly, the present invention is not limited to any particular platform, unless specifically stated otherwise in the present disclosure.

The present invention has been described above with reference to preferred embodiments. However, those skilled in the art will recognize that changes and modifications may be made in these preferred embodiments without departing from the scope of the present invention. Other system architectures, platforms, and implementations that can support various aspects of the invention may be utilized without departing from the essential characteristics as described herein. These and various other adaptations and combinations of features of the embodiments disclosed are within the scope of the invention. The invention is defined by the claims and their full scope of equivalents.

The invention claimed is:

1. A motion and position sensitive method for configuring user interfaces of a mobile device, the method comprising:

measuring one or more motion or position attributes of the mobile device using a motion sensor to produce a first value based on change in level of movement or position;

comparing the first value with one or more threshold values associated with the change in level of movement or position; and adjusting one or more user interfaces of the mobile device to be locked or illuminated in accordance with a plurality of lock state or illumination intensity scenarios, respectively, wherein the first value is between a first predetermined set of threshold values and a second predetermined set of threshold values which define the occurrence of at least two events related to change in level of movement or position.

2. The method of claim 1, wherein the adjusting comprises increasing illumination intensity of the mobile device's illuminating mechanism.

3. The method of claim 1, wherein the adjusting comprises decreasing illumination intensity of the mobile device's illuminating mechanism.

4. The method of claim 1, wherein the motion or position attributes comprise one or more of the following: speed, acceleration, deceleration, direction of movement, degree of shock or pressure applied to the mobile device, and whether the mobile device is standing upright or lying horizontally.

5. The method of claim 1, wherein a time delay is associated with the adjusting.

6. The method of claim 1, wherein the mobile device's illuminating mechanism is a backlight for lighting the one or more user interfaces.

7. The method of claim 6, wherein the mobile device's illuminating mechanism is a light emitting diode (LED).

8. The method of claim 1, wherein the one or more user interfaces comprise one or more keys on a keypad of the mobile device.

9. The method of claim 1, wherein the one or more user interfaces comprise a display screen of the mobile device.

10. A motion and position sensitive system for configuring user interface of a mobile device, the system comprising:
   a motion sensor for measuring one or more motion or position attributes of the mobile device to produce a first value based on change in level of movement or position;
   a logic unit for comparing the first value with one or more threshold values associated with the change in level of movement or position;
   an illumination mechanism for illuminating one or more user interfaces of the mobile device; and
   a power management module for adjusting the one or more user interfaces of the mobile device to be locked or illuminated in accordance with a plurality of lock state or illumination intensity scenarios, respectively, wherein the first value is between a first predetermined set of threshold values and a second predetermined set of threshold values which define the occurrence of at least two events related to the change in level of movement or position.

11. The system of claim 10, wherein the illumination mechanism adjusts illumination intensity of the mobile device.

12. The system of claim 10, wherein the motion or position attributes comprise one or more of the following: speed, acceleration, deceleration, direction of movement, degree of shock or pressure applied to the mobile device, and whether the mobile device is standing upright or lying horizontally.

13. The system of claim 10, wherein a time delay is associated with adjusting the one or more user interfaces of the mobile device to be locked or illuminated in accordance with a plurality of lock state or illumination intensity scenarios, respectively.

14. The system of claim 10, wherein the one or more user interfaces comprise one or more keys on a keypad of the mobile device.

15. The system of claim 10, wherein the one or more user interfaces comprise a display screen of the mobile device.

16. The system of claim 10, wherein the illuminating mechanism is a backlight.

17. The system of claim 16, wherein the illuminating mechanism is a light emitting diode (LED).

18. The system of claim 10, wherein the power management module comprises a power management chip in communication with a microcontroller for determining whether to adjust the one or more user interfaces of the mobile device to be locked or illuminated in accordance with a plurality of lock state or illumination intensity scenarios, respectively.

19. The system of claim 18, wherein the power management chip converts a first signal provided by the motion sensor to a second signal provided to the microcontroller, wherein the first signal represents a change in the one or more motion or position attributes of the mobile device, and the second signal represents a value used by the microcontroller to adjust the one or more user interfaces of the mobile device to be locked or illuminated in accordance with a plurality of lock state or illumination intensity scenarios, respectively.

* * * * *